United States Patent

Prabhu et al.

[11] Patent Number: 5,845,307
[45] Date of Patent: Dec. 1, 1998

[54] AUXILIARY REGISTER FILE ACCESSING TECHNIQUE

[75] Inventors: J. Arjun Prabhu, Palo Alto; Philip A. Ferolito; Eric T. Anderson, both of Sunnyvale; James A. Bauman, San Jose, all of Calif.

[73] Assignee: Sun Microsystems, Inc., Palo Alto, Calif.

[21] Appl. No.: 787,339

[22] Filed: Jan. 27, 1997

[51] Int. Cl.$^6$ .................................................. G06F 12/02
[52] U.S. Cl. .......................................................... 711/2
[58] Field of Search ................ 364/DIG. 1 MS File, 364/DIG. 2 MS File; 395/376; 711/2, 5, 100, 152, 157, 170, 200, 215

[56] References Cited

U.S. PATENT DOCUMENTS

| | | | |
|---|---|---|---|
| 4,070,703 | 1/1978 | Negi | 711/5 |
| 4,318,175 | 3/1982 | Hawley | 711/5 |
| 5,615,348 | 3/1997 | Koino et al. | 711/5 |

Primary Examiner—Robert B. Harrell
Attorney, Agent, or Firm—The Gunnison Law Firm

[57] ABSTRACT

Certain bits in existing op code formats for a processor do not change from one instruction to another when particular classes of instructions are used. Applicants optionally utilize one or more of these bits to identify one of a plurality of different register files from which to retrieve operands or to store the results of an operation. These bits along with allocated address bits in predetermined address fields now allow the processor to address many more registers. This can be used to increase the performance of the processor. Those programs not utilizing the bits outside of the address fields for designating a particular register file are backwards compatible with the modified processor.

16 Claims, 4 Drawing Sheets

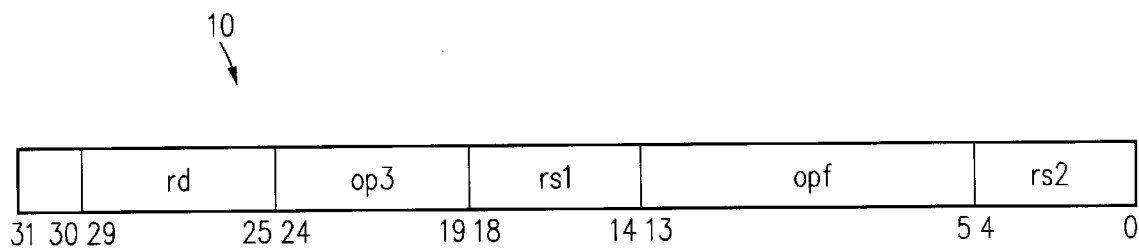

FIG. 1 (PRIOR ART)

| Opcode | opf | Operation |
|---|---|---|
| FPADD16 | 0 0101 0000 | FOUR 16-BIT ADD |
| FPADD16S | 0 0101 0001 | TWO 16-BIT ADD |
| FPADD32 | 0 0101 0010 | TWO 32-BIT ADD |
| FPADD32S | 0 0101 0011 | ONE 32-BIT ADD |
| FPSUB16 | 0 0101 0100 | FOUR 16-BIT SUBTRACT |
| FPSUB16S | 0 0101 0101 | TWO 16-BIT SUBTRACT |
| FPSUB32 | 0 0101 0110 | TWO 32-BIT SUBTRACT |
| FPSUB32S | 0 0101 0111 | ONE 32-BIT SUBTRACT |

FIG. 2 (PRIOR ART)

| Opcode | op3 | opf | Operation |
|---|---|---|---|
| FMULs | 11 0100 | 0 0100 1001 | MULTIPLY SINGLE |
| FMULd | 11 0100 | 0 0100 1010 | MULTIPLY DOUBLE |
| FMULq | 11 0100 | 0 0100 1011 | MULTPILY QUAD |
| FsMULd | 11 0100 | 0 0110 1001 | MULTIPLY SINGLE TO DOUBLE |
| FdMULq | 11 0100 | 0 0110 1110 | MULTIPLY DOUBLE TO QUAD |
| FDIVs | 11 0100 | 0 0100 1101 | DIVIDE SINGLE |
| FDIVd | 11 0100 | 0 0100 1110 | DIVIDE DOUBLE |
| FDIVq | 11 0100 | 0 0100 1111 | DIVIDE QUAD |

FIG. 3A (PRIOR ART)

AUXILIARY REGISTER FILE ACCESSING TECHNIQUE

FIELD OF THE INVENTION

This invention relates to addressing techniques and, in particular, to a technique for addressing additional register files using a fixed instruction format.

BACKGROUND

The following background is in the context of a processor having a 32-bit architecture, but applies to virtually any architecture. FIG. 1 illustrates a 32-bit operation code (op code) 10 format for an UltraSPARC™ processor manufactured by Sun Microelectronics. The op code 10 contains various fields including an operation field (opf) identifying the specific operation to be performed, a first operand field (rs1) identifying the address of the first operand in a register file, a second operand field (rs2) identifying the address of the second operand in a register file, a result field (rd) identifying the address in a register file where the result of the operation is to be stored, and a general class field (op3) identifying the class of the operation to be performed such as a floating point (FP) operation, a visual instruction set (VIS) operation (typically used for graphics displays), an integer operation, or a load/store operation. Bit positions 30 and 31 identify a larger class. The bit positions of the various fields in the 32-bit op code 10 are identified in FIG. 1.

Other architectures have similar predetermined locations for the various fields, and the present invention applies to a variety of architectures. Additional information regarding the UltraSPARC™ op code format and structure is found in the manual entitled Ultra SPARC™ User's Manual Revision 2.0—June 1996, by Sun Microelectronics, incorporated herein by reference.

It is very important that the various field lengths, op code organization, and instruction sets for a particular architecture not be changed, since the industry relies on that particular architecture and the existing instruction set for future applications.

The op code 10 identifies that a particular functional unit is to perform the operation in field opf on the operands located at the addresses in fields rs1 and rs2, then store the result in the address in field rd. In this particular architecture, five bits are allocated to each of the rs1, rs2, and rd fields. Hence, the register file can only have 32 addressable locations. In the UltraSPARC™ processor, each word in a particular address of the register file has 64 bits.

Functional units, such as a floating point adder and multiplier and a VIS functional unit, require the full 32 addressable locations in the register file for worst case processes.

It would be desirable to increase the number of functional units carrying out the operations in order to perform a number of operations simultaneously to increase the overall speed of the processor. However, the optimal performance benefit of adding more functional units is not realized if the number of addressable registers remains constant at 32.

SUMMARY

Applicants have discovered a technique which can be used with a variety of architectures, such as the 32-bit architecture of the UltraSPARC™ processor, to access additional register files while using the existing op code format shown in FIG. 1.

Applicants have identified certain bit positions in the op code format whose bits do not change from one instruction to another when particular classes of instructions are used. One example of such bits are in bit positions 12 and 13 of the op code format for the UltraSPARC™ processor for a VIS operation. In the instruction set for the VIS operations, bits 12 and 13 are always 00. Another example of such bits are in bit positions 9 and 13 for one class of floating point operations. Bits 9 and 13 are always 00.

In accordance with one embodiment of the invention, Applicants now optionally utilize bits 12 and 13 (or 9 and 13) to identify one of up to four different register files, each having 32 addresses. These two bits along with the five bits in each of the rs1, rs2, and rd fields effectively allow these fields to address any one of 128 locations, rather than 32. This allows additional functional units to be employed in the processor to optimally increase the speed of the processor. Those desiring to not utilize bits 12 and 13 (or 9 and 13) for designating a particular register file may simply set bits 12 and 13 (or 9 and 13) to 00 as is presently done. Hence, the added flexibility is transparent if one does not chose to take advantage of it.

This concept may be applied to other architectures where the bits in certain bit positions are either always the same or unused.

BRIEF DESCRIPTION OF THE DRAWINGS

FIG. 1 illustrates a 32-bit op code format for an UltraSPARC™ processor.

FIG. 2 illustrates a partial instruction set for a visual instruction set (VIS) operation, used for graphics displays, for an UltraSPARC™ processor.

FIG. 3A illustrates a partial instruction set for a floating-point multiply or divide operation for an UltraSparc™ processor.

DETAILED DESCRIPTION OF THE PREFERRED EMBODIMENTS

FIG. 2 illustrates the addition/subtraction subset of the visual instruction set (VIS) for a VIS functional unit, used typically for generating a graphics display created by a computer. FIG. 2 shows the alpha-numeric op code, the corresponding code in the opf field in the format of FIG. 1, and a description of the operation performed. The identity of the operands on which the operation is performed and the storage location for the result of the operation are identified in the rs1, rs2, and rd fields in the op code format of FIG. 1, previously described. The fact that the opf field identifies VIS instructions is conveyed in the op3 field (FIG. 1) by the code 110110.

FIG. 3A illustrates a partial instruction set for a floating-point multiply and divide functional unit which identifies the alpha-numeric op code, the code in the op3 field for identifying the functional unit, the code in the opf field for identifying the particular operation to be performed, and a description of the corresponding operation.

Figures 3B, 4, 5:
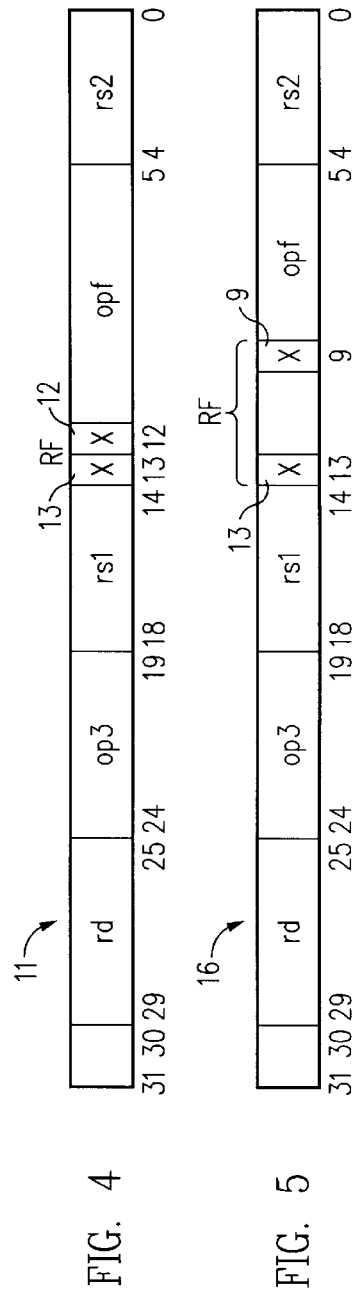
FIG. 3B illustrates a more complete instruction set for the floating-point arithmetic operations revealing that bits 9 and 13 in the opf code are always set to 00.
FIG. 4 is similar to the op code format of FIG. 1 but modified to illustrate bit positions 12 and 13 in a VIS op code which identify a particular register file, out of a plurality of register files, which is addressed by the rs1, rs2, or rd fields.
FIG. 5 is the op code format of FIG. 1 modified to illustrate bit positions 9 and 13 in a floating point op code which identify a particular register file.

FIG. 3B is a more complete instruction set for the floating point operations, identifying the op code nomenclature as well as the corresponding 9-bit opf code (8:0) in bit positions 5–13 in FIG. 1.

Applicants have noted that the first two bits (bit positions 12 and 13) at the left of the opf code in the VIS of FIG. 2 are always 00 and that the first and fifth bits (bit positions 9 and 13) from the left of the opf code in the floating point instruction set are always 00. Hence, once it is identified that the instruction set is either VIS (op3=$36_{16}$) or a floating point (op3=$34_{16}$) operation, it is then known that the bits at bit positions 12 and 13 for a VIS operation and bit positions 9 and 13 for a floating point operation convey no information. Though a similar situation applies with other instruction sets either in the operation field or another field, only a VIS addition/subtraction instruction set and a floating-point instruction set are presented for illustration.

FIG. 4 illustrates an op code format 11 similar to that of FIG. 1 but modified to identify the two bit positions 12 and 13 in the operation field opf for a VIS operation, which now contains bits for identifying a particular register file among a plurality of register files.

FIG. 5 illustrates a similar op code format 16 for a floating point operation, which identifies the two bit positions 9 and 13 in the opf field used to identify a particular register file.

Since two bits in the VIS and floating point op code are available for designating a register file, due to these two bits being always the same, one of up to four register files may be identified in these two bit positions. Thus, since up to four register files, each having 32 addresses, can be identified by the two bits and each of the rs1, rs2, and rd fields may identify one out of 32 addresses, the registers have been increased from 32 to up to 128.

Figure 6:
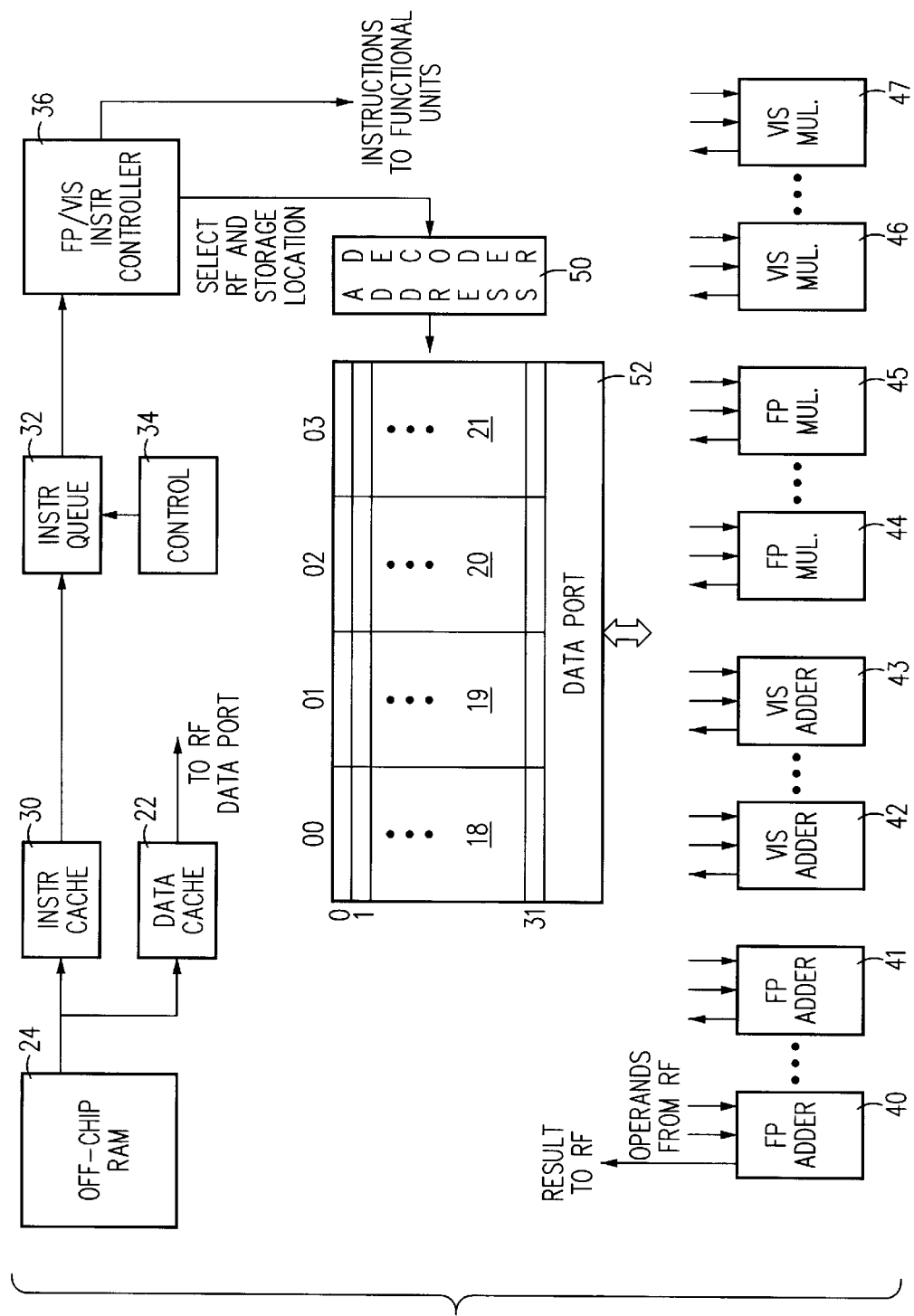
FIG. 6 illustrates the pertinent portions of a processor having a plurality of register files, where a particular register file is identified using bits in an op code format which were previously used for a different purpose.
Figure 7:
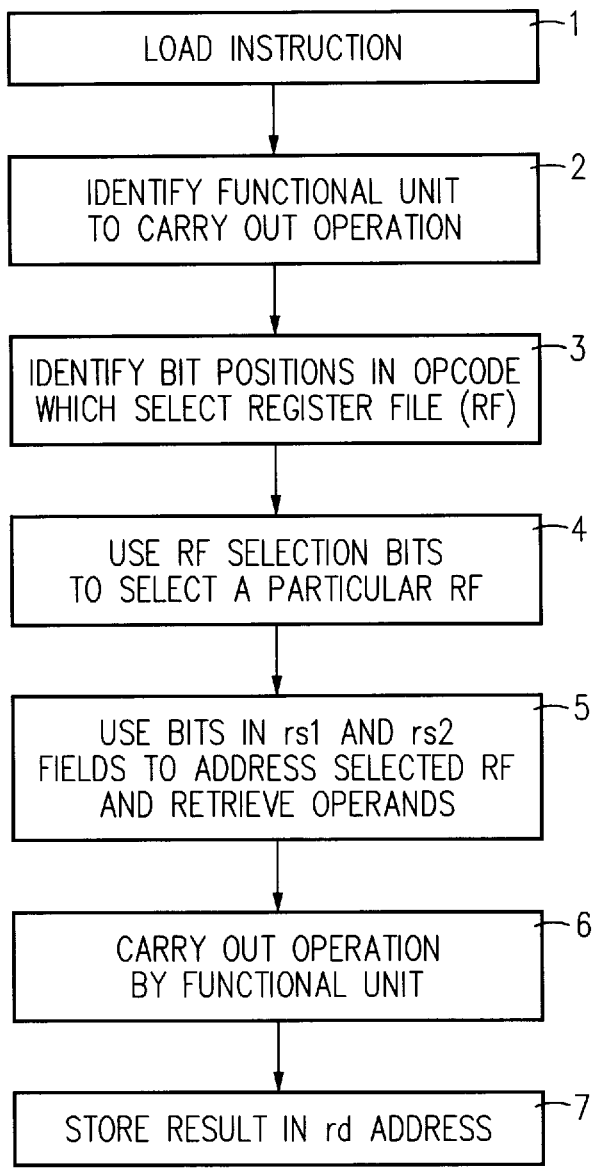
FIG. 7 is a flowchart of a method carried out in accordance with one embodiment of the invention.

An application of this technique will now be described with respect to FIGS. 6 and 7. FIG. 6 illustrates modifications to a conventional processor for implementing the present invention. Since the architecture of processors is well known to those skilled in the art, a detailed description of the operation of processors is unnecessary to fully explain the present invention.

In FIG. 6, data is stored in designated addresses in a group of register files 18, 19, 20 and 21 via a data cache 22. An instruction in the form of the op code format 11 or 16 in FIGS. 4 or 5 is provided from an external RAM 24 into an instruction cache 30.

The instruction in the instruction cache 30 is then provided to an instruction queue 32 which in one embodiment has a capacity for 16 instructions. The next instruction in the queue 32, under the control of an instruction queue controller 34, is applied to an FP/VIS instruction controller 36, as identified in step 1 of FIG. 7. Controller 36 then dispatches the instruction to the proper functional unit 40–47 (step 2 in FIG. 7). Examples of functional units are illustrated as floating point and VIS adders 40–43 and floating point and VIS multipliers 44–47. Additional functional units would typically exist. Controller 36 determines the availability of the various functional units prior to tasking a particular functional unit to carry out the instruction. Controller 36 is typically a hardwired logic circuit.

Controller 36 addresses the register files to retrieve the operands for the designated functional unit as follows.

The locations of the one or more bits in the op code format 11 or 16 which identify the particular register file 18–21 to which the five address bits in the rs1, rs2, and rd fields apply depend upon the particular instruction set, as previously described. For example, for the VIS, the bits in bit positions 12 and 13 may be used to identify a particular register file since these two bit positions are essentially not utilized in the VIS (i.e., they are always 00). The controller 36 is programmed (in hardware or software) to associate particular bit positions, not necessarily adjacent, with the identification of a particular register file, shown in step 3 of FIG. 7, depending on the type of instruction (i.e., the op 3 field). The controller 36 will use the bit values in these bit positions to select a particular register file. If these particular bit positions occur in the opf field, the controller 36 will assign preprogrammed logical values (e.g., 00) to those bit positions when transmitting the opf instruction to the functional unit.

In step 4, the one or more bits in the bit positions containing the identification of the register file are decoded by decoder 50 to select one of the four register files 18–21. In the illustrated example, each of the register files 18–21 have 32 addresses and 64 bits per word. Register file 18 is identified by the 2-bit code 00 in bit positions 12 and 13 (assuming a VIS instruction), register file 19 is identified by the code 01, register file 20 is identified by the code 10, and register file 21 is identified by the code 11.

In step 5, the 5-bit operand address fields rs1 and rs2, illustrated in FIG. 4, are then used by controller 36 to address the two operands in the selected register file. Although the rs1 and rs2 fields are five bits, these fields can now address one of 128 locations using the present invention. These two operands are then retrieved and applied to the functional unit via a data port 52 of the register files. In the preferred embodiment, the FP and VIS adders 40–43 share the same data buses and the FP and VIS multipliers 44–47 share the same data buses.

In step 6, the functional unit carries out the operation on the operands.

In step 7, the functional unit stores the result of the operation in the address identified in the rd field, shown in FIG. 4, in the selected register file.

In certain operations, only a single operand is retrieved (read) from a register file and processed by a functional unit.

Thus, the number of addressable registers may be increased by four times without changing the op code format or the instruction set. If the programmer decides not to take advantage of the increased flexibility of the processor, the programmer would only use the traditional opf codes identified in FIGS. 2, 3A, and 3B to always access the first register file 18.

If a customer desires faster processing, the customer may purchase a processor containing additional functional units and a plurality of register files, such as shown in FIG. 6. In such a case, the programmer may then use the bits 12 and 13, for example, in the VIS op code to access any one of four register files, each having 32 addresses. The processor may be scaled to 32, 64, 96, or 128 registers, depending upon the needs of the customer, without affecting the instruction set or op code format for other customers not requiring the additional register files. This maintains backwards compatibility of the modified processor so that it can run on existing programs.

In the examples provided herein, the three 5-bit address fields in the op code effectively have been increased to 7 bits each by utilizing only two unused bits in the op code. This translates into using one-thirdas many bits as would be required had each of the address fields been expanded by two bits.

Those skilled in the art will understand that the concepts described herein may be applied to any other architecture, such as 16-bit or 64-bit architecture, and any op code format.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method carried out by a processor, said processor carrying out designated operations on at least one operand, after retrieving said at least one operand from one or more registers, and writing a result in a destination register, addresses of said at least one operand in said one or more registers and said destination register being identified by at least two N-bit fields in an operation code format, said method comprising:

identifying in said operation code format a first address field, having N bits, containing a first address of a first storage location within a register file, said register file having up to $2^N$ addressable locations;

identifying in said operation code format a second address field, having N bits, containing a second address of a second storage location within said register file;

identifying in said operation code format one or more register file selection bits outside of said first address field and said second address field for designating one of a plurality of register files as a selected register file for said first address and said second address, each register file in said plurality of register files having up to $2^N$ addressable locations; and applying said first address and said second address to said selected register file to read said at least one operand from said selected register file and write said result into said selected register file.

2. The method of claim 1 wherein one or more bit positions storing said register file selection bits comprise bit positions 12 and 13 in an operation code format for a processor carrying out a visual instruction set operation.

3. The method of claim 1 wherein one or more bit positions storing said register file selection bits comprise bit position 12 in an operation code format for a processor carrying out a visual instruction set operation.

4. The method of claim 1 wherein one or more bit positions storing said register file selection bits comprise bit position 13 in an operation code format for a processor carrying out a visual instruction set operation.

5. The method of claim 1 wherein one or more bit positions storing said register file selection bits comprise bit positions 9 and 13 in an operation code format for a processor carrying out a floating point operation.

6. The method of claim 1 wherein one or more bit positions storing said register file selection bits comprise bit position 9 in an operation code format for a processor carrying out a floating point operation.

7. The method of claim 1 wherein one or more bit positions storing said register file selection bits comprise bit position 13 in an operation code format for a processor carrying out a floating point operation.

8. A method for programming a processor, said processor carrying out designated operations on at least one operand, after retrieving said at least one operand from one or more registers, and writing a result in a destination register, addresses of said at least one operand in said one or more registers and said destination register being identified by at least two N-bit fields in an operation code format, said method comprising:

providing in said operation code format a first address field, having N bits, containing a first address of a first storage location within a register file, said register file having up to $2^N$ addressable locations;

providing in said operation code format a second address field, having N bits, containing a second address of a second storage location within said register file;

providing in said operation code format one or more register file selection bits outside of said first address field and said second address field for designating one of a plurality of register files as a selected register file for said first address and said second address, each register file in said plurality of register files having up to $2^N$ addressable locations; and providing an instruction in said operation code format for causing said processor to apply said first address and said second address to said selected register file to read said at least one operand from said selected register file and write said result into said selected register file.

9. The method of claim 8 wherein one or more bit positions storing said register file selection bits comprise bit positions 12 and 13 in an operation code format for a processor carrying out a visual instruction set operation.

10. The method of claim 8 wherein one or more bit positions storing said register file selection bits comprise bit position 12 in an operation code format for a processor carrying out a visual instruction set operation.

11. The method of claim 8 wherein one or more bit positions storing said register file selection bits comprise bit position 13 in an operation code format for a processor carrying out a visual instruction set operation.

12. The method of claim 8 wherein one or more bit positions storing said register file selection bits comprise bit positions 9 and 13 in an operation code format for a processor carrying out a floating point operation.

13. The method of claim 8 wherein one or more bit positions storing said register file selection bits comprise bit position 9 in an operation code format for a processor carrying out a floating point operation.

14. The method of claim 8 wherein one or more bit positions storing said register file selection bits comprise bit position 13 in an operation code format for a processor carrying out a floating point operation.

15. A processor comprising:

a plurality of functional units, each functional unit for carrying out a set of instructions on one or more operands and storing a result of an operation in a register;

a plurality of register files, each register file having up to $2^N$ addressable locations;

an input port receiving an instruction in an operation code format, said instruction including at least one operand address field containing a first address having N bits designating an address of a first storage location within a register file, said instruction also including a designation address field containing a second address having N bits designating a second storage location for a result of an operation carried out by a designated functional unit, said instruction also containing one or more register file selection bits outside of said at least one operand address field and said destination address field for designating one of a plurality of register files as a selected register file for said first address and said second address, each register file in said plurality register files having up to $2^N$ addressable locations; and a controller receiving said instruction and selecting one of said plurality of register files as a selected register file based on said one or more register file selection bits, said controller applying said first address to said selected register file to read an operand from said selected register file to apply said operand to a designated functional unit.

16. The processor of claim 15 wherein said designated functional unit writes said result into said second storage location in said selected register file after performing an operation on one or more operands from said selected register file.

* * * * *